United States Patent [19]

Boström

[11] Patent Number: 4,933,915
[45] Date of Patent: Jun. 12, 1990

[54] METHOD OF INDICATING THE TIME OF AN ACOUSTIC PULSE AND A DEVICE FOR CARRYING OUT THE METHOD

[76] Inventor: Jan I. Boström, Nordhemsgatan 49, S-413 06 Göteborg, Sweden

[21] Appl. No.: 335,540
[22] PCT Filed: Sep. 16, 1986
[86] PCT No.: PCT/SE86/00415
§ 371 Date: Mar. 15, 1989
§ 102(e) Date: Mar. 15, 1989
[87] PCT Pub. No.: WO88/02124
PCT Pub. Date: Mar. 24, 1988

[51] Int. Cl.⁵ .............................................. G01S 15/00
[52] U.S. Cl. ...................................... 367/99; 367/127; 367/908
[58] Field of Search .................. 367/87, 99, 124, 127, 367/908; 73/597, 861.27, 861.28

[56] References Cited
U.S. PATENT DOCUMENTS

4,022,058  5/1977  Brown ............................... 73/861.28
4,334,431  6/1982  Kohno et al. ........................... 73/597
4,480,485  11/1984  Bradshaw et al. ................. 73/861.28

Primary Examiner—Thomas H. Tarcza
Assistant Examiner—Daniel T. Pihulic
Attorney, Agent, or Firm—Merchant, Gould, Smith, Edell, Welter & Schmidt

[57] ABSTRACT

In a method of indicating the time of an acoustic pulse at the transmission or reception of the same, the acoustic pulse is a wave package, the amplitude envelope of which having an ascending and a descending flank. The method is characterized in that the beginning of the descending flank of the amplitude is detected for determining of a reference time in the wave package, that a predetermined zero crossing in the wave package is identified from the reference time and that the time of the identified zero crossing is determined. A device for carrying out the method and for use in an acoustic system (1) comprising means (3) for generating of an electric signal (E1, E2) corresponding the acoustic pulse (P1, P2) is characterized by first means (9) arranged to detect the beginning of the descending flank of the electric signal for determining of the reference time of the wave package and to generate a trigger signal (C) corresponding to the reference time, and second means (10) arranged to respond to the trigger signal (C) for identifying the predetermined zero crossing in the wave package and to generate a time signal (D) corresponding to the identified zero crossing (D).

8 Claims, 4 Drawing Sheets

METHOD OF INDICATING THE TIME OF AN ACOUSTIC PULSE AND A DEVICE FOR CARRYING OUT THE METHOD

The present invention refers to a method of indicating the time of an acoustic pulse at the transmission or reception of the same, the acoustic pulse comprising a wave package, the amplitude envelope of which having an ascending and a descending flank. The invention also refers to a device for carrying out such a time indication of an acoustic pulse being transmitted or received in an acoustic system which comprises means for the generation of an electric signal that corresponds to the pulse.

Advantageously, the method and the device according to the invention can be used for the measurement of transit time in an echo type acoustic system, i.e. a system in which the transit time of an acoustic pulse is measured from the time of transmission of the pulse and to the time it is again received after having been reflected.

Such acoustic measurement systems exist in several variants and may be used in many different areas, for example measuring level or volume in tanks, containers or similar in measuring distance, for example autofocusing in camera lenses, in measuring of flow, in medical diagnostics, such as ultrasound examination, in position determination etc.

Due to the fact that, in particular, the method and the device according to the invention solve the problems of today in the measurements of transit time in connection with echo type acoustic liquid level measurement in tanks and containers, a brief description will follow of the design and function of a known acoustic liquid level measurement sytem and then the problems existing in such a system will be elucidated.

In acoustic liquid level measurement of the so-called echo type an acoustic transducer is provided at the highest point in a container which contains the liquid, the level or volume of which is to be measured. The acoustic transducer is fed from a transmitter with a first electric signal, such as a wave package of a relatively short duration. In response to this first signal the transducer generates a corresponding acoustic pulse which is transmitted downwards towards the surface of the liquid. After reflection against the surface the pulse is again picked up by the transducer which in response thereof generates a second electric signal which is fed to a receiver. The time interval between the first and the second electric signal, i.e. the transit time of the acoustic pulse, is determined and the distance from the transducer to the surface of the liquid can be calculated with a knowledge of the propagation velocity of the acoustic pulse in the medium in question.

Obviously, in connection with such a transit time measurement it is important to be able to make an accurate determination of the time of reception of the reflected pulse or echo. In this connection there are a number of factors that can cause incorrect measurement results in the indication of time of the transmitted and the received acoustic pulse, respectively.

One known way of indication of time of an acoustic pulse is simply to detect the presence or absence of the pulse. In this case the accuracy in the indication of time of the pulse or the electric signal is essentially dependent on the width of the amplitude envelope of the wave package.

In order to achieve a higher accuracy in the indication of time of acoustic pulses different types of threshold level detectors have been proposed. In these cases the indication of time is performed by a detector that detects the amplitude of the pulse and approves the pulse if its amplitude exceeds a preset threshold level. The indication of time of the pulse occurs at the moment the amplitude of the pulse exceeds the threshold level.

In many cases threshold level detection on the positive or ascending flank does not give a sufficient accurate indication of time of the pulse and an attempt to increase the accuracy by increasing the slope of the ascending flank involves an increased bandwidth which is unfavourable and in turn causes a worse signal-to-noise ratio.

Further, the threshold level technique has the disadvantage to be sensitive to variations in the amplitude of the echo due to varying distance of travel of the pulse following the changes in the liquid level. A strong attenuation of the pulse can, for example, result in that the amplitude never reaches the threshold value which then has to be chosen so low that also acoustic interferences can be interpreted as valid echo pulses. A less strong attenuation of the acoustic pulse can cause the point of intersection of the threshold level with the amplitude envelope to be moved upwards along the ascending flank, i.e. the indicated time upon which the transit time measurement is based will be displaced within the wave package.

The problem of displacement of the measured time along the ascending flank of the wave package is particularly striking in case proportionately low carrier frequences are being used, because a small attenuation of the amplitude in this case due to the weak slope of the ascending flank can cause a great change of the time at which the amplitude envelope intersects the threshold value. For example, low acoustic frequencies are preferred in connection with level measurements in containers for inflammable liquids which from the point of view of the explosion risk should not be exposed to high electric power levels in the transducer.

In case the acoustic pulse is propagated in a tube or the like between the transducer and the liquid surface it is also preferred to use low frequency pulses which are less sensitive to disturbances caused by drip deposits, protuding reference points and the like in the tube, have less demand for power and are less inclined to create oscillation modes of higher order. The use of high-frequency pulses, which in the present case essentially means that the wavelength of the acoustic pulse carrier is equal to or less than the diameter of the tube, in addition to the basic mode involves a number of oscallation modes of higher order to propagate through the tube. In contrast to a plane wave or the basic mode the modes of higher order propagate not only along the length direction of the tube but also in its lateral direction, which may cause false echo pulses and by that incorrect measurement results.

In order to achieve a satisfactory accuracy in such an acoustic tube measuring system, hitherto one has been forced to use sound of relatively high frequency due to the problems of accuracy described above and relating to the indication of time of low frequency pulses.

Accordingly, the object of the invention is to eliminate the problem referred to above and to provide a method and a device of the kind indicated by way of introduction which permits a considerably improved accuracy in the indication of time of acoustic pulses as compared to what is possible to achieve with known acoustic measuring technique of today.

A particular object is to provide a method and a device of the kind indicated by way of introduction which makes possible an extremely exact indication of time of acoustic pulses of relatively low frequency.

Another object is to provide a method and a device of the kind indicated by way of introduction which eliminates the need for the traditional threshold value detection in connection with the indication of time of acoustic pulses.

An additional object is to provide a method and a device of the kind indicated by way of introduction which makes possible an exact indication of time which is independent of variations in amplitude of the transmitted or the received pulse.

These and other objects will be achieved by the use of a method of the kind indicated by way of introduction which is characterized in that the beginning of the descending flank of the amplitude envelope is detected for determining of a reference time in the wave package, that a predetermined zero crossing in the wave package is identified from the reference time and that the time of the identified zero crossing is determined.

Preferably, the determination of the reference time is carried out essentially when the peak value of the acoustic wave falls below the immediately preceding peak value, i.e. at the beginning of the negative flank of the amplitude envelope.

In order to carry out the method indicated above according to the invention there is provided a device of the kind indicated by way of introduction for indicating the time of acoustic pulses, said device being further characterized in that it comprises first means arranged to detect the beginning of the descending flank of the electric signal for determining of a reference time in the wave package and to generate a trigger signal corresponding to the reference time, and second means arranged to respond to the trigger signal in order to identify a predetermined zero crossing in the wave package and to generate a time signal corresponding to the identified zero crossing.

Hence, according to the invention the descending flank of the amplitude envelope is used in indicating the time of the pulse contrary to the traditional threshold value detection in which the positive or ascending flank of the amplitude envelope is used for the time indication by using the beginning of the descending flank in determining a reference time, a change in the amplitude of the wave package, for example due to attenuation, will not influence on the position of the reference time relative to the wave package. Further, the novel and particular characterizing feature of the invention is that a predetermined zero crossing is identified in the wave package and that a calculation of the transit time or the like can be made by a calculation of the difference in time between predetermined zero crossings in the respective wave package.

Other features of the method and the device according to the invention are indicated in the appending claims.

The invention will now be described in detail by a preferred embodiment of a device for carrying out the method according to the invention in connection with a measurement of transit time with reference to the accompanying drawings.

Figure 1:
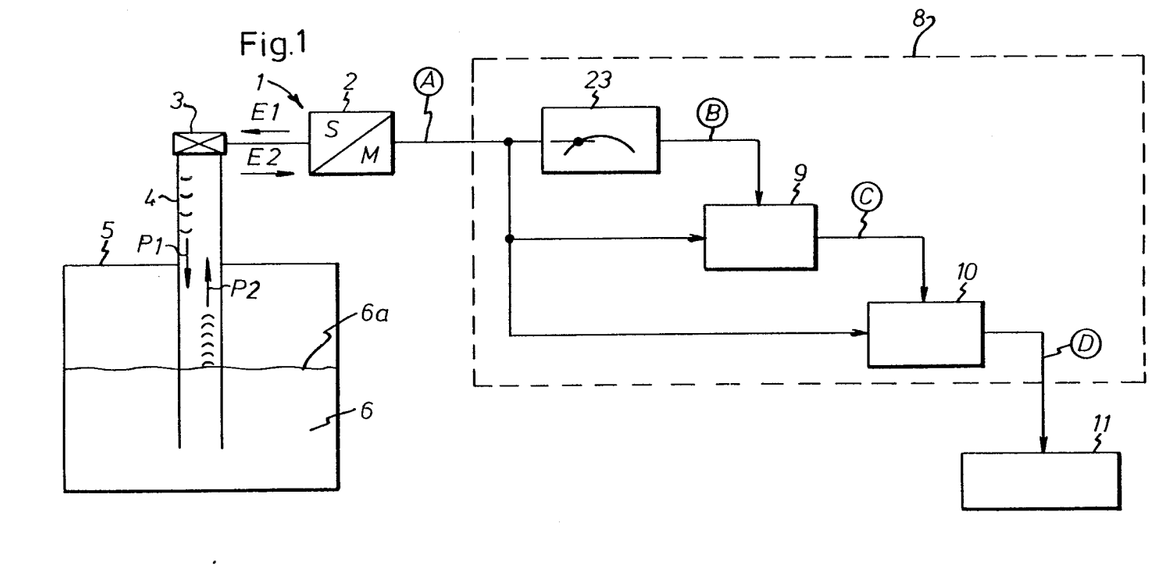
FIG. 1 shows schematically a known acoustic level measuring system which is provided with a device according to the invention.
Figure 2:
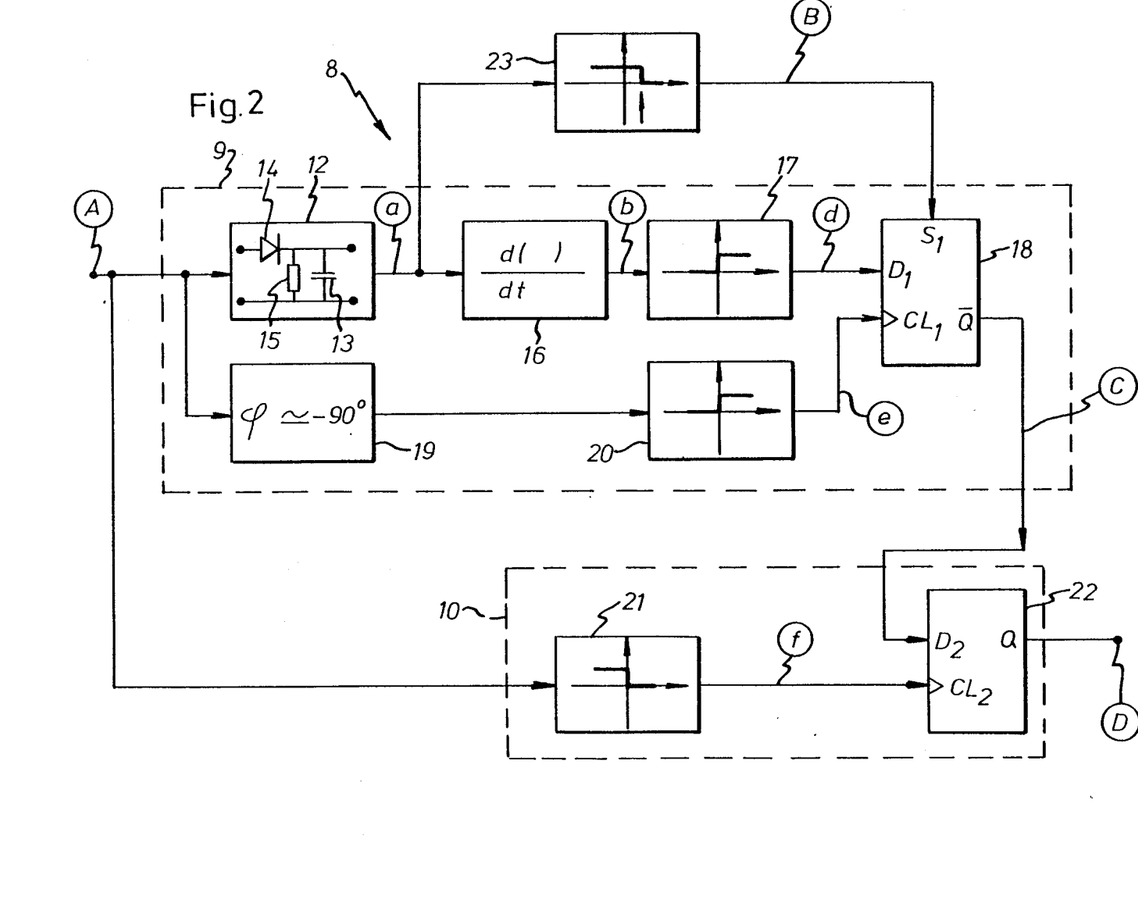
FIG. 2 shows schematically the build-up of the device according to the invention in FIG. 1.
Figure 3A:
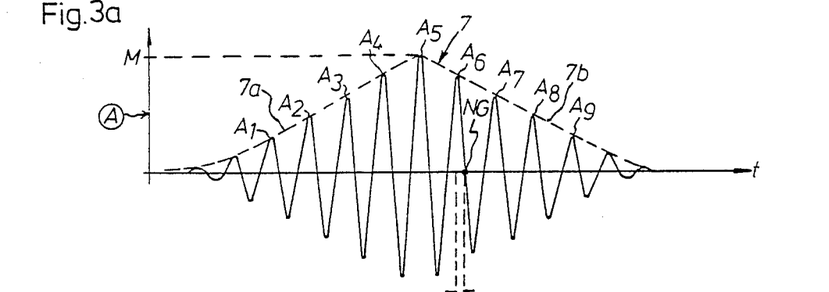
FIGS. 3a–h are time charts which show the wave forms of signals which appears in the measuring system and the device in FIGS. 1 and 2.

An acoustic level measuring system, in FIG. 2 generally indicated by 1, comprises a transmitter-receiver which is electrically connected to an electro-acoustic transducer 3 disposed at the top of a tube 4. The transmitter-receiver 2 may be constituted by a single unit, as shown in FIG. 1, or by a loudspeaker in combination with a microphone. The tube 4 extends through the upper part of a container or tank 5 which contains a liquid 6, the level of which in the container is to be measured. The acoustic transducer 3 receives a predetermined intervals a first electric signal E1 in the shape of a wave package from the transmitter 2 and generates in response thereto an acoustic pulse P1, which is permitted to propagate through the tube 5 and to be reflected against the liquid surface 6a, which is disposed above the lower edge of the tube 4. A certain time after the transmission, called the transit time of the pulse, the reflected pulse or echo P2 is received by the transducer 3, which transduces the echopulse P2 to a second electric signal E2. The principle appearance of the acoustic pulses P1 and P2 and the corresponding electric signals E1 and E2 are schematically illustrated in FIG. 3a by a signal A, the wave peaks of which A1–A9 have an amplitude envelope 7 indicated by a dashed line, the envelope having an ascending and a descending flank 7a and 7b, respectively.

Via the transmitter-receiver 2 the measuring system 1 is connected to a time-indicating and measuring device 8, constructed in accordance with the invention. The purpose of the device is to receive the first electric signal E1, which causes the transmitted pulse P1, and also the second electric signal E2, which is generated at the reception of the reflected pulse P2 and to determine the transit time of the pulse from the two electric signals E1 and E2. More precisely, the purpose of the device 8 is to identify a predetermined zero crossing in the first and the second electric signal, respectively, in the following called signal A, the transit time being calculated from the difference in time between the two indicated points of time. In the embodiment shown the predetermined zero crossing is constituted by the zero crossing NG in the signal A indicated in FIG. 3a. Accordingly, the purpose is upon detecting of an electric signal A, to identify and determine the time $T_N$ for the zero crossing NG. Due to the fact that the electric signals E1 and E2 are fed to the same device 8 a possible drift in the device and an amplifier or the like connected thereto will not influence on the result of the time indication and the measuring of transit time.

The device 8 has an envelope detector 9, the construction of which will be described in detail below. The envelope detector 9 receives the electric signal A and detects the beginning of the negative flank 7b of the amplitude envelope 7. The envelope detector determines a predetermined time, referred to as the reference time $T_R$ (see FIG. 3a), in the wave package at the negative flank 7b of the amplitude envelope 7 immediately after the envelope has started to descend. At the moment the reference time $T_R$ has been determined the envelope detector 9 generates a trigger signal C (see FIG. 3f), which is fed to a zero crossing detector 10 in the device 8.

The zero crossing detector 10 is also supplied with the electric signal A and is operated by the trigger signal C from the envelope detector 9 to identify the predetermined zero crossing NG in the wave package. At the moment $T_N$ when the zero crossing detector 10 identifies the predetermined zero crossing NG the detector generates a time signal D (see FIG. 3h), which is fed to a signal processing unit 11, such as a microprocessor. It is to be pointed out that the definition zero crossing is a relative one and that the zero level does not need to be entirely symmetrical with respect to the signal A, as shown in FIG. 3a. More precisely, for certain reasons, for example due to zero level noise in amplifiers, transducers etc., it may be preferable to slightly displace the zero level intended for the indication of the zero crossing NG with respect to what has been shown in FIG. 3a.

Accordingly, at a measurement occasion, i.e. the transmission of the pulse P1 and the reception of the echo P2, the signal processing unit 11 will first receive the time signal D for the pulse P1 and the corresponding time $T_N$ for the zero crossing NG in the first signal E1 is stored. Then, on detecting of the echo P2, the signal processing unit 11 receives the time signal D which corresponds to the echo P2 and which indicates the time $T_N$ for the zero crossing NG in the second signal E2. The transit time of the pulse is then calculated in the signal processing unit 11 from the difference in time between the time $T_N$, determined for the transmitted pulse P1, and the time $T_N$, determined for the reflected pulse. Knowing the propagation velocity of the pulse in the actual medium the searched liquid level can then be calculated in a known way.

The set-up and function of the device 8 according to the invention will now be described more in detail by a preferred embodiment with reference to FIGS. 2 and 3.

Figure 3B:
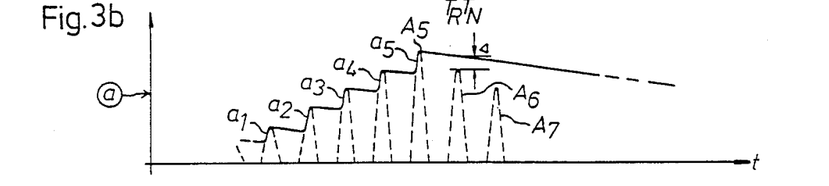

As shown in FIG. 2, the envelope detector 9 comprises an input stage 12 connected to the transmitter-receiver 2. In the embodiment shown the input stage is a capacitor 13 which via a rectifying means, such as a diode 14, is being instantaneously charged to the peak values of the signal A concurrently with the reception of the signal, and which via a resistor 15 is being discharged in the time intervals between the peak values of the signal A. The input stage 12 can be considered as a halfwave-rectifier or an RC-filter having a suitable time constant. More precisely, the resistance value of the resistor 15 is selected such that during discharge the charging voltage of the capacitor 13, after the passing of the maximum point of the envelope, decreases at a slower rate than the peak values of the wave package at the descending flank 7. The principle appearance of the output signal a of the input stage 12 is schematically illustrated in FIG. 3b, the charging wave forms being shown at $a_1$–$a_9$. It is to be noted that discharging to a certain extent in the time intervals between the wave peaks $A_1$–$A_9$ of the signal A is necessary to also make possible the detecting of such acoustic pulses which have an amplitude envelope 7 with a linear horizontal portion between the ascending and the descending flank.

Figure 3C:
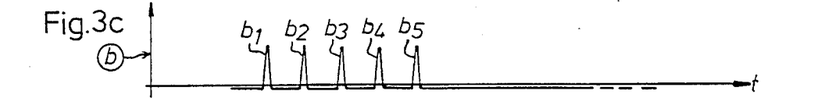

The input stage 12 is followed by a differentiation stage 16, in which the output signal of the input stage 12 is differentiated with respect to time. The output signal b of the differentiation stage 16 consists of narrow pulses, the pulses $b_1$–$b_5$ of which, corresponding to the wave peaks $A_1$–$A_5$ of the signal a are shown in FIG. 3c. In a suitable way, then the signal b is shaped in a pulse former 17 to form a pulse train d shown in FIG. 3d, the pulses $d_1$–$d_5$ of which correspond to the respective pulses $b_1$–$b_5$, i.e. to the charging wave forms $a_1$–$a_5$ of the capacitor 13 shown in FIG. 3a. The output signal of pulse train d is fed to the D-input of a D-flip-flop 18 to the clock input $CL_1$ of which is supplied a timing signal e. The timing signal e is derived from the signal A by a circuit 19, which in the embodiment shown causes a phase shift of the signal A of about 90°, as well as a pulse former 20, by which the positive halfperiods of the phase shifted signal A are shaped. The phase shift of the circuit 19 is selected such that the positive flank of the pulses in the timing signal e fall within the pulses of the output signal d of the pulse former 17, as appears from a comparison between FIG. 3d and FIG. 3e or from FIG. 4. The trigger signal C of the envelope detector 9 is taken from the inverting output $\overline{Q}$ of the D-flip-flop 18.

The zero crossing detector 10 comprises an inverting pulse former 21 and a D-flip-flop 22, the D-input $D_2$ of which receives the trigger signal C from the envelope detector 9 and at its clock input $CL_2$ receives a timing signal f from the pulse former 21. The timing signal f, illustrated in FIG. 3g is achieved by inverting and pulse shaping of the signal A, wherethrough the positive flank of the timing pulses f from an aspect of time will coincide with the negative zero crossings of the signal A. The timing signal D, the appearance of which being illustrated in FIG. 3h, is obtained on the non-inverting output Q of the D-flip-flop 22 and is fed to the signal processing unit 11, as shown in FIG. 1.

As shown in FIGS. 1 and 2, the device according to the preferred embodiment can be provided with a threshold detector 23, which at its input receives the signal a from the input stage 12 and at its output is connected to the enable input $S_1$ of the D-flip-flop 18. The threshold detector 23 detects the signal a and approves the signal A only if the amplitude of the signal a exceeds a predetermined threshold value, in which case an improval signal B is fed to the enable input $S_1$ of the D-flip-flop 18, which is activated in response to the improval signal B. By this the detecting of false echo pulses, caused by noise or the like, will be prevented.

The function of the device shown in FIG. 2 is as follows. Upon reception of the signal A at the input stage 12 of the detector 9, i.e. when an acoustic pulse is being transmitted or received, the capacitor 13 is charged via the diode 14 at every positive halfperiod of the signal A. Concurrent with the detection of the positive flank a charge in the capacitor increases as shown at $a_1$–$a_5$ in FIG. 3b, and the charging voltage takes its highest value when the amplitude envelope 7 reaches its maximum value M (FIG. 3a). Accordingly, when the maximum point of the envelope 7 has been passed, the capacitor 13 has been charged to its maximum voltage, which descends at a relatively slow rate through the resistor 15. As appears at $\Delta$ in FIG. 3b, the amplitude of the positive halfperiod $A_6$ immediately following the maximum point $A_5$ of the envelope is lower than the charging voltage of the capacitor at the time of the peak of the halfperiod $A_6$, and therefore the diode 14 will be biased in a non-conducting direction and any additional charging of the capacitor 13 will be prevented after the maximum point of the envelope has been passed.

The output signal a obtained from the envelope detector 9 contains information, out of which the predetermined zero crossing NG can be identified. The output signal a is differentiated with respect to time in the differentiation stage 16 and is shaped in the pulse former 17 to be fed to the D-flip-flop 18.

Figure 3D:
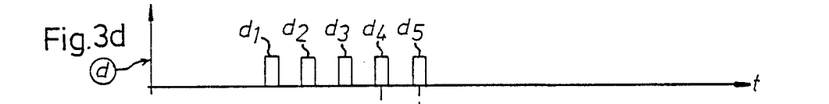
Figure 3E:
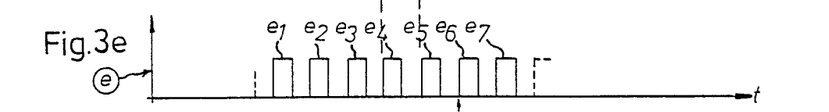
Figure 3F:
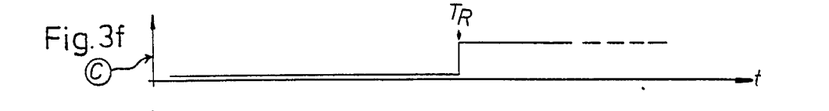
Figure 3G:
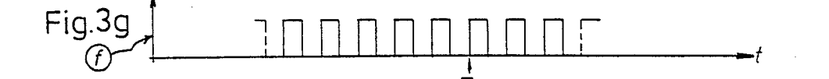
Figure 3H:
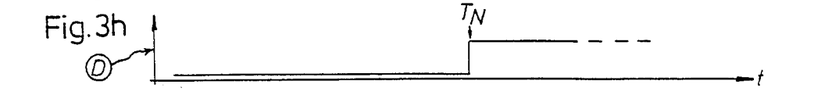

As shown in FIG. 3d, the pulse train d has pulses $d_1$–$d_5$ up to and including the positive halfperiod $A_5$ of the signal A, said halfperiod having the highest peak value. Hence, the first missing pulse of the signal d indicates that the envelope has started to descend and that a reference time $T_R$ is to be determined. This is carried out by the D-flip-flop 18 and the timing signal e. If the D-input $D_1$ of the D-flip-flop 18 is low, i.e. the signal d is low, at the same time as a positive timing signal e is applied to the clock input $CL_1$, the flip-flop 18 will switch over and its inverting output $\bar{Q}$ will go high to generate the trigger signal C. Accordingly, as shown in FIG. 3f, the positive flank of the trigger signal C will coincide with the reference time $T_R$.

Upon receipt of the trigger signal C by the second D-flip-flop 22 at the time $T_R$ this flip-flop will switch over at the next timing pulse in the signal f, i.e. at the next negative zero crossing in the signal A. Accordingly, the desired timing signal D for determining the time $T_N$ for the predetermined zero crossing NG is obtained at the output Q of the D-flip-flop 22.

Figure 4:
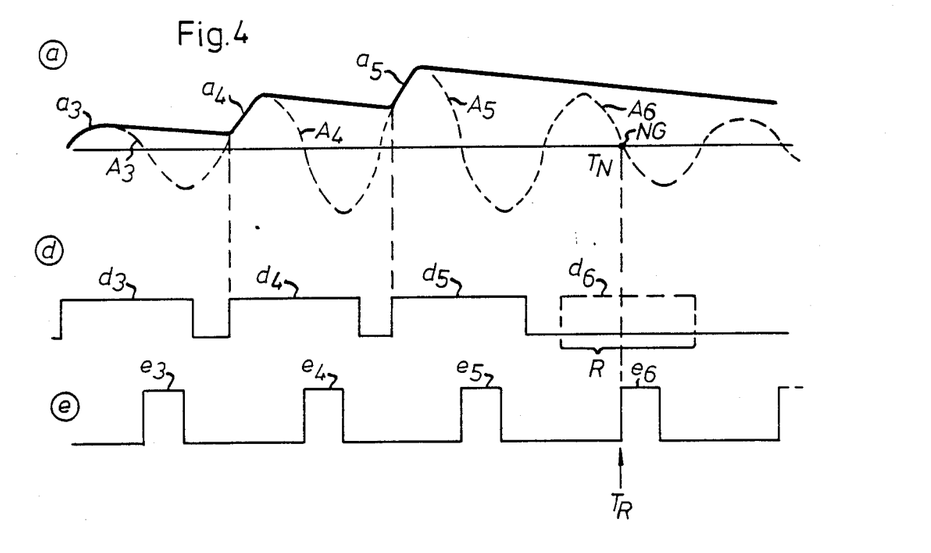
FIG. 4 shows in a greater scale the signals of FIGS. 3a, 3d and 3e and FIGS. 5A and 5B show a specific area of application of the invention.

It is to be pointed out that if the phase shift in the circuit 19 is selected in a suitable way, the D-flip-flop 22, shown in FIG. 2, and the appending pulse former 21 can be omitted. FIG. 4, which in greater scale shows the relationship between the signals A, d and e, explains how the reference time $T_R$ can be brought to coincide with the time $T_N$ for the predetermined zero crossing NG.

As shown in FIG. 4, the front flank of the d-pulses $d_3$, $d_4$ and $d_5$ coincide with the charging wave forms $a_3$, $a_4$ and $a_5$ of the capacitor. In the figure there is also shown by a dashed line the first missing pulse $d_6$ in the pulse train d. From a comparison with FIG. 3d appears that in this case a greater pulse width for the d-pulses $d_3$, $d_4$ and $d_5$ has been chosen. By increasing the pulse width the time interval R, within which the front flank of the e-pulses must fall, is extended, i.e. a greater freedom of choice is achieved as concerns the phase shift in the circuit 19. Contrary to the preceding embodiment, where the phase shift was about 90°, in the example shown in FIG. 4 such a phase shift of the e-signal has been chosen that the front flanks of the e-pulses from an aspect of time coincide with the negative zero crossings in the signal A. The first missing d-pulse $d_6$ detects by the e-pulse $e_6$ at the reference time $T_R$, which coincides with the time $T_N$ for the predetermined zero crossing NG. Obviously, in this case the trigger signal C from the D-flip-flop 18 can be used for indicating of the time of the acoustic pulses P1 or P2. However, it is to be noted that for indicating of the time of the acoustic pulse, a time is always to be chosen which coincides with or which is in the immediate vicinity of a zero crossing in the wave package.

Figures 5A, 5B:
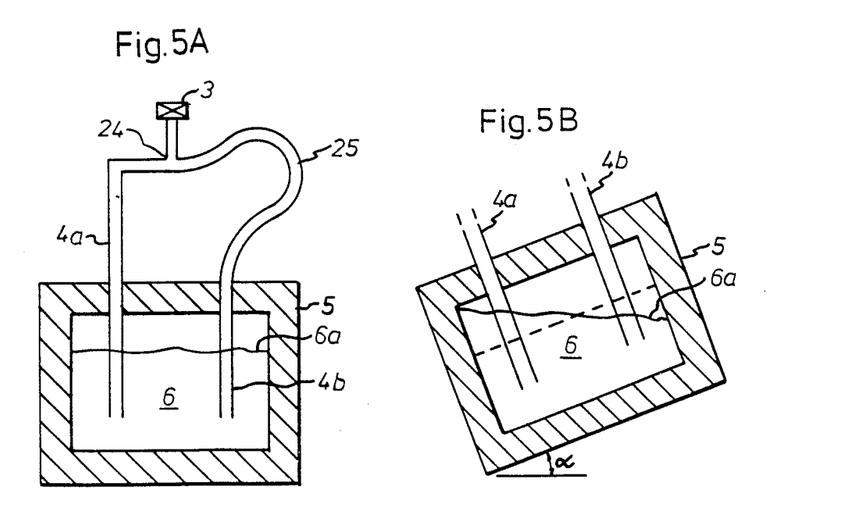

The use of the invention in connection with the indication of time between acoustic pulses is not limited to the case where the measuring of time takes place between the transmission of a pulse and the reception of a reflected part of the same pulse. In FIGS. 5A and 5B there is shown an example where a measuring of time is carried out between two echo pulses. The same reference numerals in FIG. 1 and in FIGS. 5A to 5B refer to the same parts.

The construction shown in FIGS. 5A and 5B has for its purpose to provide an exact level measurement which is independent of the slope of the container 5, for example, this problem may exist in a tanker which has an unbalanced load, in a buried tank which has been displaced due to ground frost or the like, or in a petrol tank of a vehicle which is situated on a slant ground. In compensation for the slope of the container 5 two tubes 4a and 4b are used, which are arranged at each side of the container. For turning movements about a single axis, as shown in FIG. 5B, two tubes will be required, and for turning movements about two axises a third tube will be required. The system is being built around one single acoustic transducer 3, which via a branch 24 transmits acoustic pulses through both tubes 4a and 4b. In order to separate and indicate the time of reflected echo pulses from a horizontal liquid surface 6a an acoustic delay is provided in the shape of an additional piece of tube 25 at one of the tubes (4b). Accordingly, in FIG. 5A, where the container takes its horizontal position, the transducer will first receive the echo pulse from the tube 4a and after that the echo pulse from the tube 4b. The compensation at the level measurement for the slope of the container in FIG. 5B is done by calculation of the difference in time between the echo pulses separated in this way. Obviously, the length of the extension 25 is to be chosen such that the echo pulses cannot coincide even if the container takes its maximum slope angle.

Of course, the invention must not be considered as limited to the embodiments as shown and described but can be modified in many ways within the patent protection claimed.

For example, advantageously, the device 8 shown in FIG. 2 can be completed by a shift register or the like by which the time of other zero crossings before or after the shown zero crossing can be determined. In this case, preferably, the zero crossing in the wave package is used for the indication of time, which has the best signal-to-noise ratio.

Further, it is to be understood that the method according to the invention can be carried out by other means than those shown in FIGS. 1 and 2. For example, the detector can consist of a peak detector and a comparator (analogue or digital) which for each of the electric signals compares the peak value of the signal with the immediate preceding peak value in the wave package and creates a trigger signal if the latest peak value is lower than the immediate preceding peak value. The peak detector and the comparator can be constructed as a sample-and-hold circuit in combination with an analogue comparator, or, alternatively, an A/D-converter and a digital calculation circuit.

Finally, it is to be noted that for satisfactory measurement results to be obtained by the described method, a small dispersion of the wave package is presumed. Dispersion occurs if the group velocity of the wave, i.e. the velocity of the envelope, differs from the phase velocity, i.e. the velocity of the acoustic carrier. In case of dispersion the wave peaks are displaced relative to the amplitude envelope, which may involve that another zero crossing than the predetermined zero crossing NG will be identified in the echo pulse P2.

I claim:

1. A method of establishing a time of occurrence of an acoustic pulse at transmission or reception thereof, the acoustic pulse being a wave package having a plurality of wave peaks, with an amplitude envelope having a leading and a trailing edge, characterized in that said trailing edge of the amplitude envelope is detected for establishing a reference time in said wave package, by comparing each peak value of the wave package with an immediate preceding peak value in the same wave package for establishing when one of said peak values of the acoustic wave falls below the immediately preceding peak value in the same wave package, that a predetermined zero crossing in the wave package is identified from said reference time, and that the time of occurrence of the identified zero crossing is established.

2. Method according to claim 1, characterized in that the predetermined zero crossing is a zero crossing which occurs immediately after or which coincides with said reference time.

3. Method according to claim 1, in which said acoustic wave package is first transmitted and the time of occurrence established for that transmission, and the wave package thereafter is received and the time of occurrence established for that reception, characterized in that the same predetermined zero crossing is identified in the transmitted and the received wave package, the transit time from the transmission to the reception of the wave package being calculated from the difference in time between the time of occurrence that has been established for the transmitted wave package and the time of occurrence that has been established for the received wave package.

4. Method according to claim 3, characterized in that the calculation of the transit time is performed by calculating a difference in time between those zero crossings in the transmitted and the received wave package, respectively, which have a most advantageous signal-to-noise ratio.

5. Method according to claim 1, characterized in that a predetermined zero crossing in the wave package is identified on each measuring occasion.

6. Method according to claim 1, characterized in that the wave package is caused to propagate through one or more tubes or the like, each said tube having a diameter, a carrier of the acoustic pulse having a wavelength greater than the diameter of the tube.

7. A device for establishing the time of occurrence of an acoustic pulse that is transmitted or received in an acoustic system which comprises means for generating an electric signal corresponding to the pulse, the acoustic pulse and the corresponding electric signal, respectively, being wave packages having a plurality of wave peaks, with an amplitude envelope having a leading and a trailing edge, characterized by first means arranged to detect the trailing edge of the electric signal for establishing a reference time in the wave package, by comparing each peak value of the electric signal with an immediately preceding peak value in the same wave package and to generate a trigger signal corresponding to said reference time if a latest peak value is lower than an immediately preceding peak value, and second means arranged to respond to the trigger signal for identifying a predetermined zero crossing in the wave package and to generate a time signal corresponding to the identified zero crossing.

8. Device according to claim 7, characterized in that the first means comprise at least one capacitor which via a current rectifying means, such as a diode, is instantaneously charged at a charging voltage to the peak value of the electric signal and discharged via a resistor, having a resistance value selected such that the charging voltage of the capacitor drops at a lower rate than peak values of the wave package on the trailing edge, and that said first means further comprise means for providing a time derivative of the voltage on said capacitor for generating a pulse train, a last pulse of which corresponds to last wave peak of the wave package before the trailing edge of the envelope, said trigger signal being emitted at the reference time of a first missing pulse in said pulse train.

* * * * *

UNITED STATES PATENT AND TRADEMARK OFFICE
CERTIFICATE OF CORRECTION

PATENT NO. : 4,933,915            Page 1 of 2

DATED : June 12, 1990

INVENTOR(S) : Jan I. Bostrom

It is certified that error appears in the above-identified patent and that said Letters Patent is hereby corrected as shown below:

Front page, assignee information is missing; please add:
  Assignee: BOST & CO AKTIEBOLAG
  Country:  SWEDEN Col. 1, line 35
  "sytem" should be --system--.

Col. 2, line 33-34
  "frequences" should be --frequencies--.

Col. 2, line 53
  "oscallation" should be --oscillation--.

Col. 4, line 7
  "appears" should be --appear--.

Col. 4, line 21
  "a" should be --at--.

UNITED STATES PATENT AND TRADEMARK OFFICE
CERTIFICATE OF CORRECTION

PATENT NO. : 4,933,915

DATED : June 12, 1990

INVENTOR(S) : Jan I. Bostrom

It is certified that error appears in the above-identified patent and that said Letters Patent is hereby corrected as shown below:

Col. 6, line 9
 "of" should be --or--.

Col. 8, line 15
 "axises" should be --axes--.

Signed and Sealed this

Thirty-first Day of March, 1992

Attest:

HARRY F. MANBECK, JR.

*Attesting Officer*        *Commissioner of Patents and Trademarks*